United States Patent
Takagi

(10) Patent No.: US 7,247,121 B2
(45) Date of Patent: Jul. 24, 2007

(54) CONTROL DEVICE FOR AUTOMATIC TRANSMISSION

(75) Inventor: Akira Takagi, Obu (JP)

(73) Assignee: DENSO Corporation, Kariya, Aichi-pref. (JP)

( * ) Notice: Subject to any disclaimer, the term of this patent is extended or adjusted under 35 U.S.C. 154(b) by 193 days.

(21) Appl. No.: 11/193,458

(22) Filed: Aug. 1, 2005

(65) Prior Publication Data
US 2006/0030451 A1    Feb. 9, 2006

(30) Foreign Application Priority Data
Aug. 3, 2004    (JP)    ............................. 2004-226818

(51) Int. Cl.
*G06F 7/02*    (2006.01)
(52) U.S. Cl. .......................................... 477/34; 701/55
(58) Field of Classification Search ................ 477/34; 701/55
See application file for complete search history.

(56) References Cited

U.S. PATENT DOCUMENTS 4,499,542 A * 2/1985 Hamajima et al. ............ 701/62
5,706,197 A * 1/1998 Stasik et al. ................... 701/52
6,021,368 A * 2/2000 Taniguchi et al. ............. 701/51

FOREIGN PATENT DOCUMENTS

JP    2003-294134    10/2003

* cited by examiner

*Primary Examiner*—Ha Ho
(74) *Attorney, Agent, or Firm*—Nixon & Vanderhye P.C.

(57) ABSTRACT

A position sensor for an automatic transmission has multiple switches, each of which generates "ON" or "OFF" signal depending on a selected position of a shift lever. Signal patterns ("ON" and "OFF" signals) of the normal operation are memorized as a map of signal patterns in a first memory portion. A second memory portion memorizes the respective signal patterns at the respective selected positions of the shift lever. The signal pattern and the change of the signal patterns in the second memory portion are compared with those memorized as the map of the signal pattern in the first memory portion, and determines that a malfunction has occurred in the position sensor, if at least one of the signal patterns and the changes of the signal patterns does not coincide with any of those memorized the map of the signal pattern. The malfunction of the position sensor can be surely detected at an earlier stage of operation of the shift lever for the automatic transmission.

5 Claims, 9 Drawing Sheets

FIG. 6

(SIGNAL PATTERN IN NORMAL CONDITION)

|    | P | P-R | R | R-N | N | N-D | D |
|----|---|-----|---|-----|---|-----|---|
| S1 | ○ | ○   |   |     |   | ○   | ○ |
| S2 |   | ○   | ○ | ○   |   |     | ○ |
| S3 |   |     |   | ○   | ○ | ○   | ○ |

FIG. 9

(SIGNAL PATTERN IN NORMAL CONDITION)

|    | P | P-R | R | R-N | N | N-D | D | 3 | 2 | 2-1 | 1 |
|----|---|-----|---|-----|---|-----|---|---|---|-----|---|
| S1 |   |     | ○ | ○   | ○ | ○   | ○ |   |   |     | ○ |
| S2 |   |     |   | ○   | ○ | ○   | ○ | ○ | ○ |     |   |
| S3 |   |     |   |     |   | ○   | ○ | ○ | ○ | ○   | ○ |
| S4 |   | ○   | ○ | ○   |   |     | ○ | ○ |   |     |   |

FIG. 7A
(DISCONNECTION OF S1)

|  | P | P-R | R | R-N | N | N-D | D |
|---|---|---|---|---|---|---|---|
| S1 |  |  |  |  |  |  |  |
| S2 |  | ◯ | ◯ | ◯ |  |  | ◯ |
| S3 |  |  |  | ◯ | ◯ | ◯ | ◯ |
| DETERMINATION OF MANUAL VALVE POSITION | × | R | R | R-N | N | N | R-N |

FIG. 7B
(DISCONNECTION OF S2)

|  | P | P-R | R | R-N | N | N-D | D |
|---|---|---|---|---|---|---|---|
| S1 | ◯ | ◯ |  |  |  | ◯ | ◯ |
| S2 |  |  |  |  |  |  |  |
| S3 |  |  |  | ◯ | ◯ | ◯ | ◯ |
| DETERMINATION OF MANUAL VALVE POSITION | P | P | × | N | N | N-D | N-D |

FIG. 7C
(DISCONNECTION OF S3)

|  | P | P-R | R | R-N | N | N-D | D |
|---|---|---|---|---|---|---|---|
| S1 | ◯ | ◯ |  |  |  | ◯ | ◯ |
| S2 |  | ◯ | ◯ | ◯ |  |  | ◯ |
| S3 |  |  |  |  |  |  |  |
| DETERMINATION OF MANUAL VALVE POSITION | P | P-R | R | R | × | P | P-R |

(SHORT-CIRCUIT OF S1)

|  | P | P-R | R | R-N | N | N-D | D |
|---|---|---|---|---|---|---|---|
| S1 | ○ | ○ | ○ | ○ | ○ | ○ | ○ |
| S2 |  | ○ | ○ | ○ |  |  | ○ |
| S3 |  |  |  | ○ | ○ | ○ | ○ |
| DETERMINATION OF MANUAL VALVE POSITION | P | P-R | P-R | D | N-D | N-D | D |

(SHORT-CIRCUIT OF S2)

|  | P | P-R | R | R-N | N | N-D | D |
|---|---|---|---|---|---|---|---|
| S1 | ○ | ○ |  |  |  | ○ | ○ |
| S2 | ○ | ○ | ○ | ○ | ○ | ○ | ○ |
| S3 |  |  |  | ○ | ○ | ○ | ○ |
| DETERMINATION OF MANUAL VALVE POSITION | P-R | P-R | R | R-N | R-N | D | D |

(SHORT-CIRCUIT OF S3)

|  | P | P-R | R | R-N | N | N-D | D |
|---|---|---|---|---|---|---|---|
| S1 |  | ○ | ○ |  |  | ○ | ○ |
| S2 |  |  | ○ | ○ |  |  | ○ |
| S3 | ○ | ○ | ○ | ○ | ○ | ○ | ○ |
| DETERMINATION OF MANUAL VALVE POSITION | N-D | D | R-N | R-N | N | N-D | D |

FIG. 10A
(DISCONNECTION OF S1)

|  | P | P-R | R | R-N | N | N-D | D | 3 | 2 | 2-1 | 1 |
|---|---|---|---|---|---|---|---|---|---|---|---|
| S1 |  |  |  |  |  |  |  |  |  |  |  |
| S2 |  |  |  | ○ | ○ | ○ | ○ | ○ | ○ |  |  |
| S3 |  |  |  |  |  | ○ | ○ | ○ | ○ | ○ | ○ |
| S4 |  | ○ | ○ | ○ |  | ○ | ○ |  |  |  |  |
| DETERMINATION OF MANUAL VALVE POSITION | P | P-R | P-R | ×1 | ×2 | 2 | 3 | 3 | 2 | 2-1 | 2-1 |

FIG. 10B
(DISCONNECTION OF S2)

|  | P | P-R | R | R-N | N | N-D | D | 3 | 2 | 2-1 | 1 |
|---|---|---|---|---|---|---|---|---|---|---|---|
| S1 |  |  | ○ | ○ | ○ | ○ | ○ |  |  |  | ○ |
| S2 |  |  |  |  |  |  |  |  |  |  |  |
| S3 |  |  |  |  |  | ○ | ○ | ○ | ○ | ○ | ○ |
| S4 |  | ○ | ○ | ○ |  | ○ | ○ |  |  |  |  |
| DETERMINATION OF MANUAL VALVE POSITION | P | P-R | R | R | ×4 | 1 | ×5 | ×6 | 2-1 | 2-1 | 1 |

FIG. 10C
(DISCONNECTION OF S3)

|  | P | P-R | R | R-N | N | N-D | D | 3 | 2 | 2-1 | 1 |
|---|---|---|---|---|---|---|---|---|---|---|---|
| S1 |  |  | ○ | ○ | ○ | ○ | ○ |  |  |  | ○ |
| S2 |  |  |  |  | ○ | ○ | ○ | ○ | ○ | ○ |  |
| S3 |  |  |  |  |  |  |  |  |  |  |  |
| S4 |  | ○ | ○ | ○ |  | ○ | ○ |  |  |  |  |
| DETERMINATION OF MANUAL VALVE POSITION | P | P-R | R | R-N | N | N | R-N | ×1 | ×2 | P | ×4 |

FIG. 10D
(DISCONNECTION OF S4)

|  | P | P-R | R | R-N | N | N-D | D | 3 | 2 | 2-1 | 1 |
|---|---|---|---|---|---|---|---|---|---|---|---|
| S1 |  |  | ○ | ○ | ○ | ○ | ○ |  |  |  | ○ |
| S2 |  |  |  | ○ | ○ | ○ | ○ | ○ | ○ |  |  |
| S3 |  |  |  |  |  | ○ | ○ | ○ | ○ | ○ | ○ |
| S4 |  |  |  |  |  |  |  |  |  |  |  |
| DETERMINATION OF MANUAL VALVE POSITION | P | P | ×4 | N | N | N-D | N-D | 2 | 2 | 2-1 | 1 |

FIG. 11A
(SHORT-CIRCUIT OF S1)

|  | P | P-R | R | R-N | N | N-D | D | 3 | 2 | 2-1 | 1 |
|---|---|---|---|---|---|---|---|---|---|---|---|
| S1 | ○ | ○ | ○ | ○ | ○ | ○ | ○ | ○ | ○ | ○ | ○ |
| S2 |  |  |  | ○ | ○ | ○ | ○ | ○ | ○ |  |  |
| S3 |  |  |  |  |  | ○ | ○ | ○ | ○ | ○ | ○ |
| S4 |  | ○ | ○ | ○ |  |  | ○ | ○ |  |  |  |
| DETERMINATION OF MANUAL VALVE POSITION | ×4 | R | R | R-N | N | N-D | D | D | N-D | 1 | 1 |

 

FIG. 11B
(SHORT-CIRCUIT OF S2)

|  | P | P-R | R | R-N | N | N-D | D | 3 | 2 | 2-1 | 1 |
|---|---|---|---|---|---|---|---|---|---|---|---|
| S1 |  |  | ○ | ○ | ○ | ○ | ○ |  |  |  | ○ |
| S2 | ○ | ○ | ○ | ○ | ○ | ○ | ○ | ○ | ○ | ○ | ○ |
| S3 |  |  |  |  |  | ○ | ○ | ○ | ○ | ○ | ○ |
| S4 |  | ○ | ○ | ○ |  |  | ○ | ○ |  |  |  |
| DETERMINATION OF MANUAL VALVE POSITION | ×2 | ×1 | R-N | R-N | N | N-D | D | 3 | 2 | 2 | N-D |

 

FIG. 11C
(SHORT-CIRCUIT OF S3)

|  | P | P-R | R | R-N | N | N-D | D | 3 | 2 | 2-1 | 1 |
|---|---|---|---|---|---|---|---|---|---|---|---|
| S1 |  |  | ○ | ○ | ○ | ○ | ○ |  |  |  | ○ |
| S2 |  |  |  | ○ | ○ | ○ | ○ | ○ | ○ |  |  |
| S3 | ○ | ○ | ○ | ○ | ○ | ○ | ○ | ○ | ○ | ○ | ○ |
| S4 |  | ○ | ○ | ○ |  |  | ○ | ○ |  |  |  |
| DETERMINATION OF MANUAL VALVE POSITION | 2-1 | ×6 | ×5 | D | N-D | N-D | D | 3 | 2 | 2-1 | 1 |

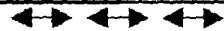

FIG. 11D
(SHORT-CIRCUIT OF S4)

|  | P | P-R | R | R-N | N | N-D | D | 3 | 2 | 2-1 | 1 |
|---|---|---|---|---|---|---|---|---|---|---|---|
| S1 |  |  | ○ | ○ | ○ | ○ | ○ |  |  |  | ○ |
| S2 |  |  |  | ○ | ○ | ○ | ○ | ○ | ○ |  |  |
| S3 |  |  |  |  |  | ○ | ○ | ○ | ○ | ○ | ○ |
| S4 | ○ | ○ | ○ | ○ | ○ | ○ | ○ | ○ | ○ | ○ | ○ |
| DETERMINATION OF MANUAL VALVE POSITION | P-R | P-R | R | R-N | R-N | D | D | 3 | 3 | ×6 | ×5 |

 

FIG. 12A PRIOR ART

|  | NORMAL CONDITION | | | |
|---|---|---|---|---|
|  | S1 | S2 | S3 | S4 |
| P | ○ | ○ | ○ | ○ |
| P-R | ○ | ○ | ○ | ● |
| R | ● | ○ | ○ | ● |
| N-R | ● | ● | ○ | ● |
| N | ● | ● | ○ | ○ |
| N-D | ● | ● | ● | ○ |
| D | ● | ● | ● | ● |
| 3 | ○ | ● | ● | ● |
| 2 | ○ | ● | ● | ○ |
| 2-1 | ○ | ○ | ● | ○ |
| 1 | ● | ○ | ● | ○ |

FIG. 12B PRIOR ART

|  | SHORT-CIRCUIT OF S4 | | | |
|---|---|---|---|---|
|  | S1 | S2 | S3 | S4 |
| P | ○ | ○ | ○ | ● |
| P-R | ○ | ○ | ○ | ● |
| R | ● | ○ | ○ | ● |
| N-R | ● | ● | ○ | ● |
| N | ● | ● | ○ | ● |
| N-D | ● | ● | ● | ● |
| D | ● | ● | ● | ● |
| 3 | ○ | ● | ● | ● |
| 2 | ○ | ● | ● | ● |
| 2-1 | ○ | ○ | ● | ● |
| 1 | ● | ○ | ● | ● |

US 7,247,121 B2

CONTROL DEVICE FOR AUTOMATIC TRANSMISSION

CROSS REFERENCE TO RELATED APPLICATION

This application is based on Japanese Patent Application No. 2004-226818, which is filed on Aug. 3, 2004, the disclosure of which is incorporated herein by reference.

FIELD OF THE INVENTION

The present invention relates to a control device for an automatic transmission of a motor vehicle, and in particular relates to a control device of the automatic transmission for detecting a malfunction of a position sensor, which detects a position of a shift lever for changing a shift position of the automatic transmission.

BACKGROUND OF THE INVENTION

A position of a selected shift range of an automatic transmission is detected by a TCU (a transmission control unit) based on electrical signals from a position sensor. The TCU drives an indicator to emit the relevant light emitting diodes in accordance with the detected shift range. The position sensor comprises multiple switches, wherein combinations of contacts of the respective switches are changed depending on the selected shift range, namely the respective positions of a movable member which is moved by a shift lever operated by a vehicle driver. The TCU detects the position of the selected shift range operated by the shift lever, based on the combination of "ON" signals and "OFF" signals from the respective switches.

In such a position sensor having multiple switches, the combination of the "ON" signals and the "OFF" signals outputted from the respective switches (hereinafter also referred to as a signal pattern) becomes different from a predetermined signal pattern corresponding to the respective shift ranges, if one of or more than one of the multiple switches become out of order (disconnected or short-circuited). In such a malfunction of the position sensor, the TCU can determine that the malfunction has occurred at the position sensor, when the combination of the outputted signals (the signal pattern) does not coincide with any one of the predetermined signal patterns. Furthermore, in the case that the signal pattern would coincide with one of the predetermined signal patterns in spite that a malfunction (the disconnection or short-circuit of the switches) has actually occurred in the position sensor, then the indication of the shift range by the indicator (e.g. the light emitting diodes) might be erroneously made to the vehicle driver. To the end, the combination of the outputted signals (the signal patterns) is generally so designed that the indication of the shift range (shift position) by the indicator to the vehicle driver is made on a safer side, when a malfunction has occurred in the switches of the position sensor. Namely, the indications by transition positions ("P-R", "R-N", of "N-D") are made in case of the malfunction, in order to avoid indications of the shift ranges "D", "R", "N", or "P", for example the indications by "D" in stead of "R", "R" in stead of "D", or "R" or "D" in stead of "N". For example, this kind of technologies is disclosed in Japanese Patent Publication No. 2003-294134.

In the above prior art (JP-No. 2003-294134), however, it has a disadvantage in that a detection of the malfunction of the position sensor is delayed, depending on the shift position of the shift lever, the switches of the position sensor in which the malfunction has occurred, and so on. An example is explained with reference to FIGS. 12A and 12B, wherein FIG. 12A shows a map of predetermined signal patterns for a normal operation, whereas FIG. 12B shows signal patterns of outputted signals when a switch S4 is short-circuited. More specifically, in FIGS. 12A and 12B, S1 to S4 are switches of the position sensor, and references "P", "P-R", "R" and so on in a vertical direction show the respective shift ranges and transition positions of the shift lever. For example, "P" is the shift range of a parking position, "R" is the shift range of a backward drive position, and "P-R" is a transition position from "P" to "R" range. Black circles indicate "ON" signals and white circles indicate "OFF" signals from the respective switches S1 to S4, depending on the shift position. When the switch S4 is short-circuited, the "ON" signal is always outputted from the switch S4 independently from the position of the shift lever, as shown in FIG. 12B. In this situation, the signal patterns (FIG. 12B) of the position sensor are different from the predetermined signal patterns (FIG. 12A), in the case that the shift lever is positioned at the "P" range", "N" range, "N-D" position, "2" range, "2-1" position and "1" range. The shift lever is usually positioned at the "P" range, when the engine is started, and therefore, the shift position is moved from the "P" range to the "P-R" position, "R" range and so on, in the order shown in FIGS. 12A and 12B. Although, the signal pattern (FIG. 12B) at the "P" range is different from the signal pattern (FIG. 12A) of the normal operation, the malfunction of the position sensor (the short-circuit of the switch S4) can not be detected at this stage, since the signal pattern (the "ON" signal from the switch S4 in FIG. 12B at the "P" range) also exists in the signal pattern of FIG. 12A in case of the "P-R" position. As in the same manner, even when the shift lever is moved to the "N" range, the signal pattern (the "ON" signals from the switches S1, S2 and S4 in FIG. 12B at the "P" range) also exists in the signal pattern of FIG. 12A in case of the "N-R" position. As above, the malfunction of the position sensor can not be detected, until the shift lever is moved to the "2-1" position. However, the signal pattern at the "2-1" position is the "ON" signals from the switches S3 and S4 and the "OFF" signals from the switches S1 and S2, and this signal pattern does not exist in the signal patterns of FIG. 12A. And therefore, the malfunction of the position sensor can be detected for the first time, when the shift lever is moved to the "2-1" position.

SUMMARY OF THE INVENTION

The present invention is made in view of the above problems. It is, therefore, an object of the present invention to provide a control device for an automatic transmission of a motor vehicle, in which a malfunction of a position sensor for the automatic transmission can be surely detected at an earlier stage of operation of a shift lever for the automatic transmission.

According to a feature of the present invention, a position sensor for an automatic transmission has multiple switches, each of which generates "ON" or "OFF" signal depending on a selected position of a shift lever operated by a vehicle driver. Signal patterns (combination of the "ON" and "OFF" signals from the multiple switches) are memorized as a map of signal patterns in a first memory portion of a transmission control unit, which corresponds to the signal patterns in case of a normal operation of the position sensor. The transmission control unit further comprises a second memory portion, which memorizes the respective signal patterns at the respective selective positions of the shift lever. A malfunction determining portion of the transmission control unit compares the signal pattern as well as the change of the signal pattern memorized in the second memory portion with those memorized as the map of the signal pattern in the first memory portion, and determines that a malfunction has occurred in the position sensor, if at least one of the signal patterns and the changes of the signal patterns does not coincide with any of those memorized in the map of the signal pattern. As a result, the malfunction of the position sensor can be surely detected at an earlier stage of operation of the shift lever for the automatic transmission.

According to another feature of the present invention, the selected positions of the shift lever include at least four shift ranges ("P", "R", "N" and "D" ranges) and multiple transition positions between those shift ranges, and the signal patterns at the respective selected positions (shift ranges and transition positions) are different from one another. According to this feature, the malfunction of the position sensor can be detected at a much earlier stage of operation of the shift lever, because a larger number of the signal patterns can be obtained when compared with the case in which the signal patterns are obtained only at the (four) shift ranges.

According to a further feature of the present invention, the selected positions of the shift lever include four shift ranges ("P", "R", "N" and "D" ranges) and the position sensor includes the three switches. Generally, the same number of switches to the number of the shift ranges is required to detect the malfunction of the respective switches. According to the above feature of the present invention, however, the number of switches can be reduced, so that the structure of the position sensor can be made in a simpler manner and at a lower cost. This is because, the malfunction of the switches is determined based on not only the signal pattern but the change of the signal patterns.

According to a still further feature of the present invention, the map of the signal patterns of the "ON" and "OFF" signals is formed as Gray code. In Gray code, the signal pattern is changed in such a manner that one "ON" signal or one "OFF" signal is different between the neighboring signal patterns. Accordingly, according to the feature of Gray code, the malfunction determining portion determines the malfunction of the position sensor, only when at least two or more than two "ON" or "OFF" signals in the signal pattern become different from the previous signal pattern. As a result, the malfunction determining portion does not determine the malfunction, if one of the "ON" or "OFF" signal in the signal pattern becomes erroneously different from the previous signal pattern. Namely, the malfunction determining portion can operate on a safer side.

According to a further feature of the present invention, the position sensor, more specifically, the multiple switches of the position sensor comprise the magnetic elements and hall elements, so that the switches are formed as contact-less type switches. As a result, an erroneous output of "ON" or "OFF" signal can be prevented and the position sensor becomes more reliable

BRIEF DESCRIPTION OF THE DRAWINGS

The above and other objects, features and advantages of the present invention will become more apparent from the following detailed description made with reference to the accompanying drawings. In the drawings:

FIG. 6 is a table showing signal patterns of the first embodiment, in which "ON" signals from the respective switches are indicated depending on a position of the manual valve, when those switches are operating in order;

FIGS. 7A to 7C are tables showing the signal patterns of the first embodiment, in which "ON" signals from the respective switches are indicated depending on a position of the manual valve, when one of the switches is disconnected;

FIG. 9 is a table showing signal patterns of a second embodiment, in which "ON" signals from the respective switches are indicated depending on a position of the manual valve, when those switches are operating in order;

FIGS. 10A to 10D are tables respectively showing the signal patterns of the second embodiment, in which "ON" signals from the respective switches are indicated depending on a position of the manual valve, when one of the switches is disconnected;

FIGS. 11A to 11D are tables respectively showing the signal patterns, in which "ON" signals from the respective switches are indicated depending on a position of the manual valve, when one of the switches is short-circuited; and FIGS. 12A and 12B are tables respectively showing the signal patterns of a prior art, in which "ON" signals and "OFF" signals from the respective switches are indicated depending on a position of a shift lever, wherein FIG. 12A is the table when the switches are operating in order, whereas FIG. 12B is the table when one of the switches is short-circuited.

DETAILED DESCRIPTION OF THE PREFERRED EMBODIMENTS

First Embodiment

An embodiment of a control device for an automatic transmission according to the present invention is explained with reference to the drawings.

Figure 1:
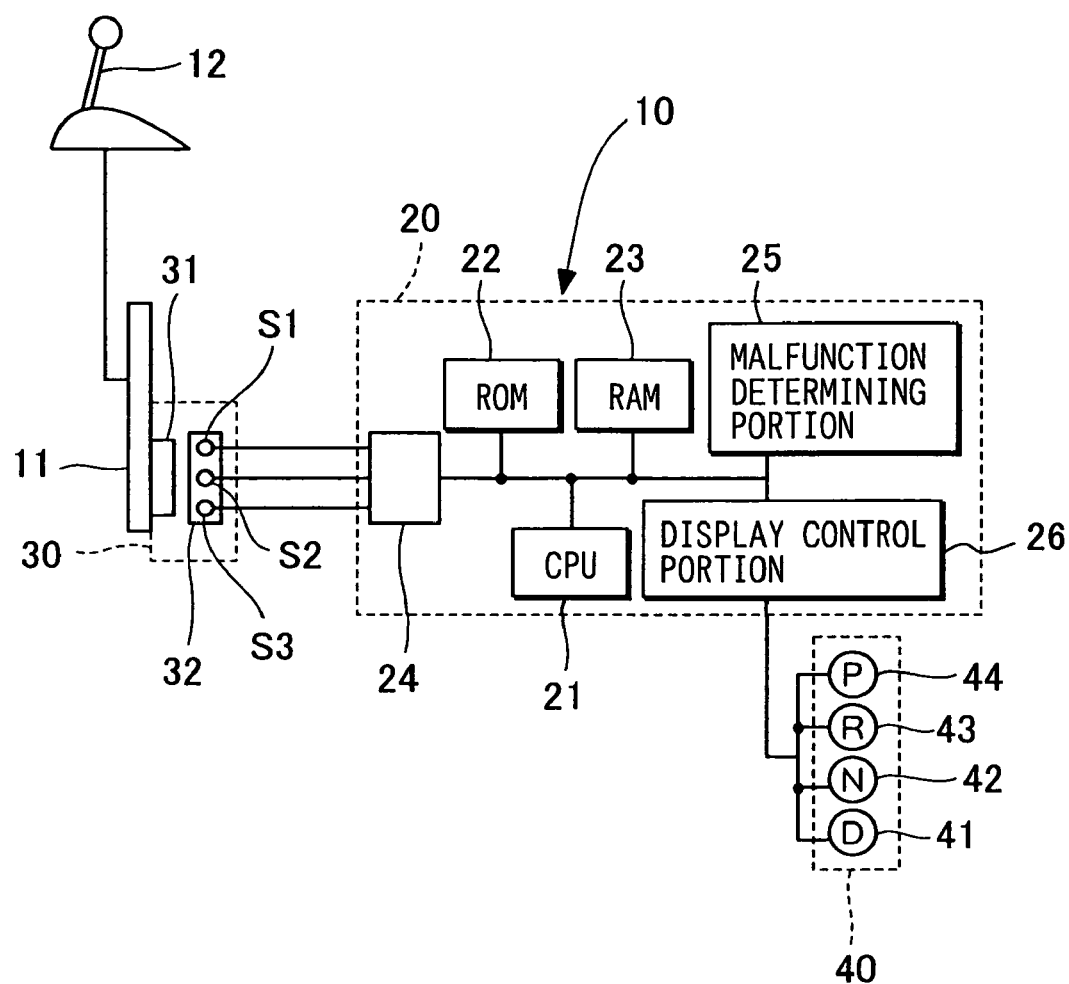
FIG. 1 is a schematic view showing a control device for an automatic transmission according to a first embodiment of the present invention.

A first embodiment of the present invention is shown in FIG. 1. A control device 10 for an automatic transmission comprises four shift ranges, that is, "P" range, "R" range, "N" range and "D" range. The control device 10 further comprises a transmission control unit (hereinafter also referred to as TCU) 20, a manual valve 11 for changing a position of the shift range, a position sensor 30 and a display portion 40.

The manual valve 11 is operatively connected with a shift lever 12 operated by a vehicle driver. The manual valve 11 can be directly connected to the shift lever 12 via a link mechanism, or can be indirectly connected with the shift lever 12 through an electrical mechanism, such as a servo-motor. The manual valve 11 operated by the shift lever 12 switches over a fluid passage of a working fluid (ATF) in an automatic transmission (not shown). Multiple friction engagement elements (such as clutches and brakes) of the automatic transmission are controlled (engaged or disengaged) in accordance with the switch-over of the fluid passage by the manual valve 11.

The transmission control unit (TCU) 20 controls an operation of the automatic transmission, and comprises a microcomputer having a CPU 21, a ROM 22 and a RAM 23. The TCU 20 further comprises a signal input portion 24, a malfunction determining portion 25 and a display control portion 26, which are respectively controlled by the CPU 21, the ROM 22 and the RAM 23. The CPU 21 controls the signal input portion 24, the malfunction determining portion 25 and the display control portion 26, by performing a computer program memorized in the ROM 22. The ROM 22 further memorizes normal signal patterns of electrical signals from the position sensor 30. The RAM 23 operates as a memory means for temporally memorizing data processed by the CPU 21, and holding the electrical signals inputted into the signal input portion 24 for a predetermined period.

Figure 2:
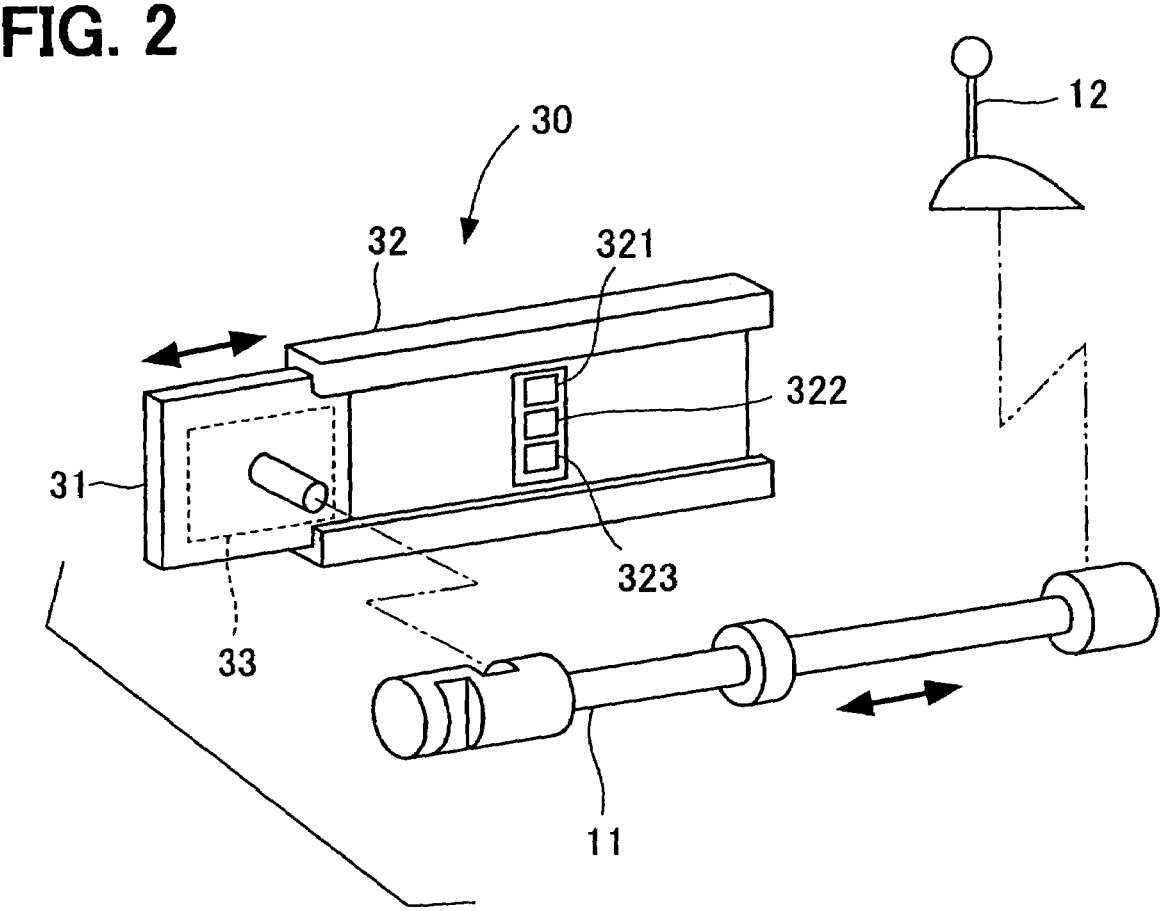
FIG. 2 is a schematic perspective view showing a manual valve and a position sensor for the control device according to the first embodiment.
Figure 3:
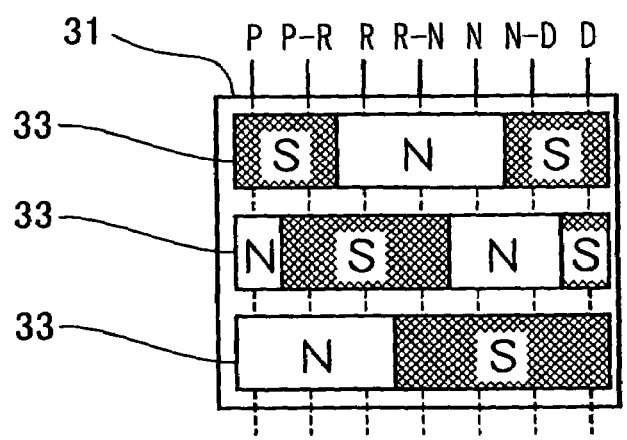
FIG. 3 is a schematic view showing a sliding portion of the position sensor.
Figure 4:
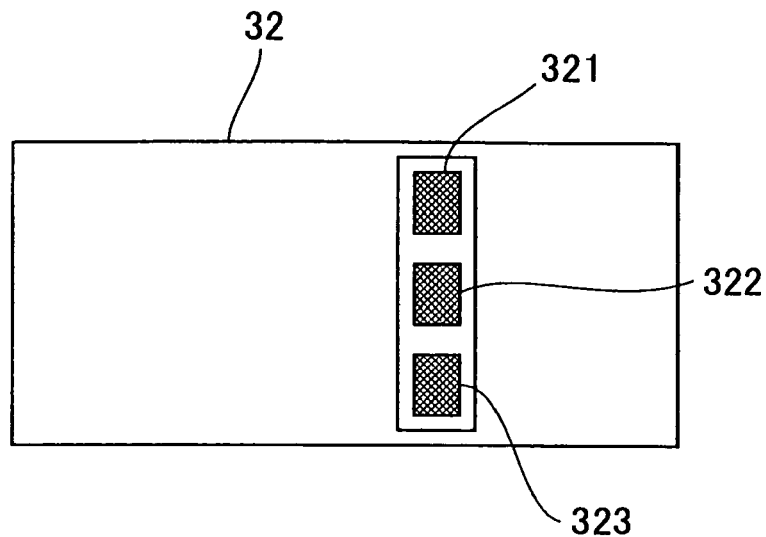
FIG. 4 is a schematic view showing a fixed portion of the position sensor.

The position sensor 30 detects a position of the shift range selected by the manual valve 11. As shown in FIG. 2, the position sensor 30 comprises a sliding portion 31 which moves together with the manual valve 11, and a fixed portion 32 which extends in a direction parallel to an axial direction of the manual valve 11. Multiple magnetic elements 33 are provided on the sliding portion 31, as shown in FIG. 3, in which different magnetic poles are formed in the sliding portion 31 within a certain longitudinal distance. Multiple hall ICs 321, 322 and 333, each having a hall element, are provided on the fixed portion 32, as shown in FIG. 4. The hall ICs 321 to 323 face to the magnetic elements 33 of the sliding portion 31, so that the hall ICs 321 to 323 detect position changes of the magnetic poles of the magnetic elements 33 when the sliding portion 31 is moved together with the manual valve 11 in the direction parallel to the axial direction of the manual valve 11.

Figure 5:
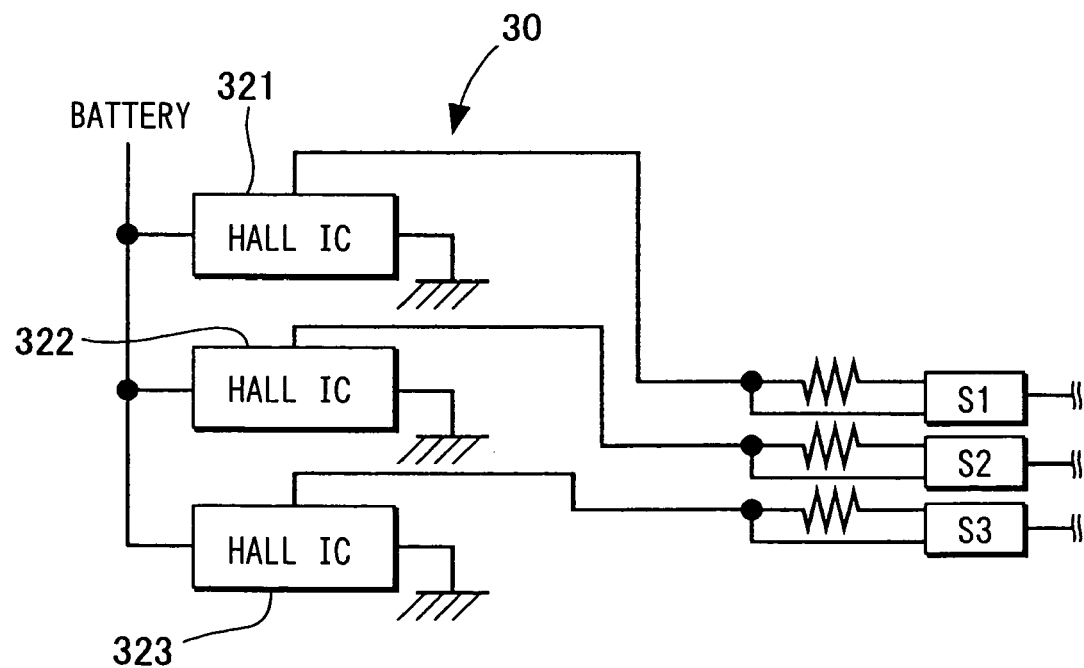
FIG. 5 is a schematic view showing an electric circuit for the position sensor.

The position sensor 30 comprises an electric circuit, as shown in FIG. 5. The hall ICs 321 to 323 are respectively connected to switches S1 to S3. In the present embodiment having four shift rages, the position sensor 30 has three switches S1 to S3. Each of the switches S1 to S3 outputs an "ON" signal, when a voltage applied from a battery to the switch is decreased. A constant voltage is applied from the battery to the hall ICs 321 to 323. Each of the hall ICs 321 to 323 connects the electric current from the battery to ground, when the "S" pole of the magnetic elements 33 of the sliding portion 31 passes by (faces to) the corresponding hall ICs 321 to 323. As a result, the voltage applied to the switches S1 to S3 is decreased and the "ON" signal is outputted. On the other hand, the hall ICs 321 to 323 do not connect the electric current from the battery to ground, when the "N" pole of the magnetic elements 33 of the sliding portion 31 passes by (faces to) the corresponding hall ICs 321 to 323. In this case, the voltage applied to the switches S1 to S3 is not decreased and an "OFF" signal is outputted. The relations between the magnetic poles of the magnetic elements and the voltage increase or decrease by the hall elements, or between the "ON" or "OFF" signals by the switches S1 to S2 and the voltage decrease or increase are not limited to those described above, and they can be freely changed.

The "ON" and "OFF" signals at the switches S1 to S3 of the position sensor 30 are inputted into the signal input portion 24 of the TCU 20. The "ON and "OFF" signals inputted into the signal input portion 24 are memorized in the RAM 23, as maps for the respective switches S1 to S3. The switches S1 to S3 of the position sensor 30 can be formed as contact-less switches, by using the magnetic elements 33 and the hall ICs 321 to 323. A break-in of foreign materials or a wear-out of the switches at contact points can be prevented, so that a stable operation of the switches can be achieved.

The display portion 40 comprises indicators (e.g. light emitting diodes) 41 to 44, for indicating the selected shift range by the manual valve 11. The display control portion 26 of the TCU 20 drives the display portion 40 to emit one of the indicators 41 to 44, corresponding to the position of the manual valve 11 detected by the position sensor 30.

An operation of the above control device 10 for the automatic transmission will be explained.

An operation is explained, at first, when the position sensor 30 is operating in order.

In the above mentioned automatic transmission, one of the shift ranges, i.e. "P" range, "R" range, "N" range or "D" range, is selected by the shift lever 12. The respective switches S1 to S3 of the position sensor 30 output the "ON" signal and "OFF" signal depending on the selected shift range, as shown in FIG. 6. In a map shown in FIG. 6, a symbol "O" means the "ON" signal, whereas the blank means "OFF" signal. Further, "P-R", "R-N" and "N-D" in the map of FIG. 6, respectively, means a transition period from "P" range to "R" range, from "R" range to "N" range, and from "N" range to "D" range.

When the manual valve 11 of the automatic transmission operates in order, the manual valve 11 is moved among "P" range, "P-R" transition, "R" range, "R-N" transition, "N" range, "N-D" transition and "D" range, as shown in FIG. 6 by the vehicle driver. And the selected position of the manual valve 11 and the outputted signals from the switches S1 to S3 have the following relations.

When the manual valve 11 is positioned at the "P" range, the "ON" signal is outputted from the switch S1, whereas the "OFF" signals are outputted from the switches S2 and S3.

When the manual valve 11 is in the "P-R" transition position, namely in the transition period from the "P" range to "R" range, the "ON" signals are outputted from the switches S1 and S2, whereas the "OFF" signal is outputted from the switch S3.

When the manual valve 11 is positioned at the "R" range, the "ON" signal is outputted from the switch S2, whereas the "OFF" signals are outputted from the switches S1 and S3.

When the manual valve 11 is in the "R-N" transition position, namely in the transition period from the "R" range to "N" range, the "ON" signals are outputted from the switches S2 and S3, whereas the "OFF" signal is outputted from the switch S1.

When the manual valve 11 is positioned at the "N" range, the "ON" signal is outputted from the switch S3, whereas the "OFF" signals are outputted from the switches S1 and S2.

When the manual valve 11 is in the "N-D" transition position, namely in the transition period from the "N" range to "D" range, the "ON" signals are outputted from the switches S1 and S3, whereas the "OFF" signal is outputted from the switch S2.

When the manual valve 11 is positioned at the "D" range, the "ON" signals are outputted from all of the switches S1 to S3.

As above, when the selected position of the manual valve 11 is changed, the different signal patterns of the output signals from the switches S1 to S3 are obtained. At least one of the "ON" signals or "OFF" signals from the switches S1 to S3 is kept unchanged, even when the selected position of the manual valve 11 is changed. The map of the signal patterns of the "ON" and "OFF" signals is formed as Gray code. The above signal patterns shown in FIG. 6 are memorized as the signal pattern map in the ROM 22.

Now, an operation of the control device, namely a malfunction determining process by the TCU 20, in the case that one of the switches S1 to S3 becomes out of order, is explained.

In the malfunction detection according to the present invention, two malfunction detecting modes are possible. Namely, in the first detecting mode, the malfunction can be detected when any one of the switches has been made out of order before an engine operation starts, whereas in the second detecting mode, the malfunction can be detected when any one of switches becomes out of order during the shift lever 12 (the manual valve 11) is operated after the start of the engine operation.

In the following explanation, the malfunction detection in the first mode is first explained, and then the malfunction in the second mode is explained.

(Disconnection of the Switch S1)

When a disconnection occurs at the switch S1, no "ON" signal is outputted from the switch S1 independently from the selected position of the manual valve 11, as shown in FIG. 7A. As a result, no "ON" signal is outputted from any of the switches S1 to S3, when the manual valve 11 is positioned at the "P" range. The RAM 23 memorizes this signal pattern as a signal-pattern-change record. The malfunction determining portion 25 compares the signal-pattern-change record memorized in the RAM 23 with the signal pattern map memorized in the ROM 22. Since there is no pattern in the signal pattern map of FIG. 6, in which no "ON" signal is outputted from any of the switches S1 to S3 (in other words, "OFF" signals are outputted from all of the switches S1 to S3, as indicated by "X" in FIG. 7A), the malfunction determining portion 25 determines that a malfunction has occurred in the position sensor 30.

When the manual valve 11 is moved to the transition period of "P-R", the "ON" signal is outputted only from the switch S2. The TCU 20 (the malfunction determining portion 25) generally recognizes that the selected shift range by the manual valve 11 is positioned at the "R" range, when the "ON" signal is outputted only from the switch S2 (as shown in FIG. 6). In the case of this situation (i.e. the disconnection of the switch S1), the TCU 20 also recognizes from the signal pattern that the selected shift range is positioned at the "R" range, in spite that the manual valve 11 is actually in the transition period "P-R".

When the manual valve 11 is moved from the "P" range to the "P-R" transition position, the "ON" signal from the switch S2 and "OFF" signals from the switches S1 and S3 are memorized in the RAM 23, as the signal-pattern-change record. Since there is no signal pattern (from "X" to "R") in the signal pattern map of FIG. 6 memorized in ROM 22, in which a signal pattern is changed from one of the patterns (in which the "OFF" signals are outputted from all of the switches S1 to S3, as indicated by "X" in FIG. 7A) to another pattern (in which the "ON" signal is outputted only from the switch S2), the malfunction determining portion 25 can also determine that a malfunction has occurred in the position sensor 30, as a result of comparing the signal-pattern-change record memorized in the RAM 23 with the signal pattern map memorized in the ROM 22, when the manual valve 11 is moved from the "P range" to the "P-R" transition position.

The above change of the signal pattern is indicated by a horizontal arrow in FIG. 7A (the meaning of the horizontal arrow in other drawings is the same to that of FIG. 7A).

When the manual valve 11 is moved from the "P-R" transition position to the "R" range, the "ON" signal is outputted from the switch S2. The signal pattern in this case is not changed, in spite that the manual valve 11 is moved from the "P-R" transition position to the "R" range. Accordingly, the malfunction determining portion 25 can not determine that a malfunction has occurred in the position sensor 30, even by comparing the signal-pattern-change record memorized in the RAM 23 with the signal pattern map memorized in the ROM 22.

When the manual valve 11 is moved from the "R" range to the "R-N" transition position, or from the "R-N" transition position to the "N" range, the signal-pattern-change is the same to that in the signal pattern map of FIG. 6, and thereby the malfunction determining portion 25 can not determine whether or not a malfunction has occurred in the position sensor 30.

When the manual valve 11 is further moved from the "N" range to the "N-D" transition position, the "ON" signal is still outputted only from the switch S3. And the TCU 20 recognizes that the manual valve 11 is still in the position of the "N" range. When the manual valve 11 is further moved from the "N-D" transition position to the "D" range, the "ON" signals are outputted from the switches S2 and S3. The TCU 20 recognizes that the manual valve 11 is in the position of the "R-N" transition position.

Although the TCU 20 recognizes (determines) that the manual valve 11 is respectively positioned at the "N" range or "R-N" transition position, which is different from the actual positions of the manual valves 11, the malfunction determining portion 25 can not determine the malfunction of the position sensor 30, only from those signal patterns. Furthermore, the malfunction determining portion 25 can not, either, determine whether or not a malfunction has occurred in the position sensor 30, even when comparing the signal-pattern-change record memorized in the RAM 23 with the signal pattern map memorized in the ROM 22. This is because the signal-pattern-change of this case (i.e. from a signal pattern of the "ON" signal from the switch S3 to a signal pattern of the "ON" signals from the switches S2 and S3) is the same to the signal-pattern-change of the normal operation of the position sensor 30 when the manual valve 11 is moved from the "N" range to the "R-N" transition position.

The above operation is the operation in the malfunction detecting mode, when the switch S1 has been made out of order before the shift lever 12 (the manual valve 11) is operated (i.e. before the engine operation starts). An operation for the second detecting mode is explained for the case, in which the switch S1 becomes out of order (disconnection) during the shift lever 12 (the manual valve 11) is operated after the start of the engine operation.

A vertical arrow in FIG. 7B indicates such a case, in which the malfunction of the switch can be detected by the change of the signal patterns, when the shift lever 12 (the manual valve 11) is positioned at a certain position and the switch S1 becomes disconnected during the period in which the shift lever 12 is maintained at its position. The meaning of the vertical arrow in other drawings is the same to that of FIG. 7A.

For example, in the case that the switch S1 becomes disconnected when the manual valve 11 is positioned at the "D" range, the signal pattern is changed from the "D" range to the "R-N" transition position, without going through the "N-D" transition position and "N" range. Since the direct change of the signal patterns from the "D" range to the "R-N" transition position does not exist in the pattern changes of FIG. 6 of the normal operation, the malfunction determining portion 25 determine that a malfunction has occurred in the position sensor 30. As in the same manner to the above operation, the signal pattern is changed from the "P" range to the "X", in the case that the switch S1 becomes disconnected when the manual valve 11 is positioned at the "P" range. As a result, the malfunction determining portion 25 determine that a malfunction has occurred in the position sensor 30.

Next, an explanation is made to the cases in which the switch S2 or S3 is disconnected, wherein the TCU 20 can determine the malfunction of the position sensor 30, in the same manner to the above explained disconnection of the switch S1.

(Disconnection of the Switch S2)

An operation for the case, in which the switch S2 has been made out of order (disconnected) before the shift lever 12 (the manual valve 11) is operated (i.e. before the engine starts its operation), is explained.

In this case, no "ON" signal is outputted from the switch S2, namely the "OFF" signal is always outputted from the switch S2, wherever the manual valve 11 is positioned or moved, as shown in FIG. 7B.

When the manual valve 11 is positioned at the "P" range, the "ON" signal is outputted from the switch S1 and the "OFF" signals are outputted from the switches S2 and S3. Then the TCU 20 recognizes that the manual valve 11 is positioned at the "P" range, but can not determine at this stage whether any malfunction has occurred in the position sensor 30.

When the manual valve 11 is moved from the "P" range to the "P-R" transition position, the respective "ON" signal and "OFF" signals from the switch S1 and from the switches S2 and S3 remain unchanged. And therefore, the TCU 20 still recognizes that the manual valve 11 should be positioned at the "P" range, and can not, either, determine even at this stage whether any malfunction has occurred in the position sensor 30.

When the manual valve 11 is further moved from the "P-R" transition position to the "R" range, the "OFF" signals are outputted from all of the switches S1, S2 and S3. Accordingly, the TCU 20 (the malfunction determining portion 25) can determine that the malfunction has occurred at the position sensor 30, based on the signal pattern (indicated by "X" in FIG. 7B) as well as the signal pattern change (from the "R" range to the "X").

Namely, there is no signal pattern memorized in the signal pattern map of FIG. 6, which is memorized in the ROM 22, wherein the "OFF" signals are outputted from all of the switches S1 to S3. Secondly, there is, either, no signal pattern change in the signal pattern map of FIG. 6, wherein the signal pattern is changed from a signal pattern of the "ON" signal from the switch S1 to another signal pattern of the "OFF" signals from all of the switches S1 to S3.

When the manual valve 11 is further moved from the "R" range to the "R-N" transition position, the "ON" signal is outputted from the switch S3 and the "OFF" signals are outputted from the switches S1 and S2. The TCU 20 recognizes that the manual valve 11 should be positioned at the "N" range in spite that it is in fact positioned at the "R-N" transition position, and can not determine only from this signal pattern whether any malfunction has occurred in the position sensor 30.

However, the malfunction determining portion 25 determines that the malfunction has occurred at the position sensor 30, based on the signal pattern change, because there is no signal pattern change (from the "X" to "N" in FIG. 7B) in the signal pattern map of FIG. 6, wherein the signal pattern is changed from a signal pattern of the "OFF" signals from all of the switches S1 to S3 to another signal pattern of the "ON" signal from the switch S3.

When the manual valve 11 is further moved from the "R-N" transition position to the "N" range, the "ON" signal from the switch S3 as well as the "OFF" signals from the switches S1 and S2 remains unchanged. The TCU 20 (the malfunction determining portion 25) still recognizes that the manual valve 11 should be positioned at the "N" range, and can not determine whether any malfunction has occurred in the position sensor 30, since there is no signal pattern change.

When the manual valve 11 is further moved from the "N" range to the "N-D" transition position, the "ON" signals are outputted from the switches S1 and S3 and the "OFF" signal is outputted from the switch S2. In this case, the TCU 20 (the malfunction determining portion 25) recognizes that the manual valve 11 is positioned at the "N-D" transition position, but can not determine from the signal pattern change whether any malfunction has occurred in the position sensor 30. Because the signal pattern change from a signal pattern of the "ON" signal from the switch S3 to another signal pattern of the "ON" signals from the switches S1 and S3 is existing in the signal pattern map of FIG. 6.

When the manual valve 11 is further moved from the "N-D" transition position to the "D" range, the "ON" signals from the switches S1 and S3 as well as the "OFF" signal from the switch S2 remains unchanged. The TCU 20 (the malfunction determining portion 25), therefore, still recognizes that the manual valve 11 should be positioned at the "N-D" transition position, and can not determine whether any malfunction has occurred in the position sensor 30, since there is no signal pattern change.

An operation for the second detecting mode is explained for the case, in which the switch S2 becomes out of order (disconnection) during the manual valve 11 is operated after the start of the engine operation.

In the case that the switch S2 becomes disconnected when the manual valve 11 is positioned at the "R" range, the signal pattern is changed from the "R" range to the "X". As a result, the malfunction determining portion 25 determine that a malfunction has occurred in the position sensor 30.

(Disconnection of the Switch S3)

In the case that the switch S3 is disconnected, no "ON" signal is outputted from the switch S3, namely the "OFF" signal is always outputted from the switch S3, wherever the manual valve 11 is positioned or moved, as shown in FIG. 7C.

When the manual valve 11 is position at either one of the "P", "P-R" and "R" ranges, or moved from one position to the other among those ranges, the TCU 20 respectively recognizes that the manual valve 11 is positioned at the corresponding "P" range, "P-R" transition position or the "R" range, and can not determine at those positions whether or not any malfunction has occurred in the position sensor 30.

When the manual valve 11 is further moved from the "R" range to the "R-N" transition position, the "ON" signal from the switch S2 as well as the "OFF" signals from the switches S1 and S3 remains unchanged. Therefore, the TCU 20 still recognizes that the manual valve 11 should be positioned at the "R" range in spite that it is in fact positioned at the "R-N" transition position, and can not, either, determine whether any malfunction has occurred in the position sensor 30, since there is no change of the signal patterns between the "R" range and "R-N" transition position.

When the manual valve 11 is further moved from the "R-N" transition position to the "N" range, the "OFF" signals are outputted from all of the switches S1 to S3. As a result, the TCU 20 (the malfunction determining portion 25) can determine that the malfunction has occurred at the position sensor 30, based on the signal pattern as well as the signal pattern change.

Namely, there is no signal pattern memorized in the signal pattern map of FIG. 6, which is memorized in the ROM 22, wherein the "OFF" signals are outputted from all of the switches S1 to S3. Furthermore, there is, either, no signal pattern change in the signal pattern map of FIG. 6, wherein the signal pattern is changed from a signal pattern of the "ON" signal from the switch S2 to another signal pattern of the "OFF" signals from all of the switches S1 to S3.

When the manual valve 11 is further moved from the "N" range to the "N-D" transition position, the "ON" signal is outputted from the switch S1 and the "OFF" signals are outputted from the switches S2 and S3. Although the TCU 20 (the malfunction determining portion 25) can not determine from the signal pattern (i.e. the "ON" signal from the switch S1) that the malfunction has occurred at the position sensor 30, but can determine the malfunction of the position sensor 30 from the change of the signal patterns, namely from the signal pattern of the "OFF" signals from all of the switches S1 to S3 to the signal pattern of the "ON" signal from the switch S1.

When the manual valve 11 is further moved from the "N-B" transition position to the "D" range, the "ON" signals are outputted from the switches S1 and S2 and the "OFF" signal is outputted from the switch S3. The TCU 20 (the malfunction determining portion 25), therefore, recognizes that the manual valve 11 should be positioned at the "P-R" transition position, and can not determine whether any malfunction has occurred in the position sensor 30. This is because the change of the signal patterns (the "ON" signal from the switch S1 to the "ON" signals from the switches S1 and S2) is the same to the case in which the manual valve 11 is moved from the "P" range to the "P-R" transition position.

An operation for the second detecting mode is explained for the case, in which the switch S3 becomes out of order (disconnection) during the manual valve 11 is operated after the start of the engine operation.

In the case that the switch S2 becomes disconnected when the manual valve 11 is positioned at the "N" range, "N-D", or "D" range, the signal pattern is respectively changed from the "N" range to the "X", "N-D" to "P" range" or the "D" range to the "P-R". As a result, the malfunction determining portion 25 determine that a malfunction has occurred in the position sensor 30, since the changes of the signal patterns do not exist in the pattern changes of FIG. 6 of the normal operation, An operation of the control device, namely a malfunction determining process by the TCU 20, in the case that one of the switches S1 to S3 becomes short-circuited, is explained.

(Short-Circuit of the Switch S1)

Figure 8A:
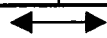
FIGS. 8A to 8C are tables showing the signal patterns of the first embodiment, in which "ON" signals from the respective switches are indicated depending on a position of the manual valve, when one of the switches is short-circuited.

When a short-circuit occurs at the switch S1, the "ON" signal is always outputted from the switch S1 independently from the selected position of the manual valve 11, as shown in FIG. 8A. And the malfunction of the position sensor 30 can be detected in the following cases.

The "ON" signals are outputted from all of the switches S1 to S3, when the manual valve 11 is positioned at the "R-N" transition position. The TCU 20 (the malfunction determining portion 25) can not determine only from this signal pattern that the malfunction has occurred in the position sensor 30, since the same signal pattern of the "ON" signals from all of the switches S1 to S3 also exists in the case that the manual valve 11 is positioned at the "D" range.

However, the TCU 20 (the malfunction determining portion 25) can determine that the malfunction has occurred in the position sensor 30, based on the change of the signal patterns. Namely, in the case that the manual valve 11 is moved from the "N-D" transition position to the "D" range, the signal pattern is changed from a signal pattern of the "ON" signals from the switches S1 and S3 to a signal pattern of the "ON" signals from all of the switches S1 to S3, when all of the switches S1 to S3 are operating in order, as mentioned above. In such a normal operation, the detected position of the manual valve 11 is changed from the "N-D" transition position to the "D" range. On the other hand, in case of the short-circuit of the switch S1, the signal pattern is changed in such a manner that a signal pattern of the "ON" signals from the switches S1 and S2 is changed to another signal pattern of the "ON" signals from all of the switches S1 to S3, when the manual valve 11 is actually moved from the "R" range to the "R-N" transition position. And such a change of the signal patterns does not exist in the signal pattern map of FIG. 6, which is memorized in the ROM 22.

An operation for the second detecting mode is explained for the case, in which the switch S1 becomes out of order (short-circuited) during the manual valve 11 is operated after the start of the engine operation.

In the case that the switch S1 becomes short-circuited when the manual valve 11 is positioned at the "R-N", the signal pattern is changed from the "R-N" to the "D" range". As a result, the malfunction determining portion 25 determine that a malfunction has occurred in the position sensor 30, since the changes of the signal patterns do not exist in the pattern changes of FIG. 6 of the normal operation.

(Short-Circuit of the Switch S2)

Figure 8B:

When a short-circuit occurs at the switch S2, the "ON" signal is always outputted from the switch S2 independently from the selected position of the manual valve 11, as shown in FIG. 8B. And the malfunction of the position sensor 30 can be detected in the following case.

The "ON" signals are outputted from all of the switches S1 to S3, when the manual valve 11 is positioned at the "N-D" transition position (e.g. moved from the "N" range). The TCU 20 (the malfunction determining portion 25) can not determine from only this signal pattern, either, that the malfunction has occurred in the position sensor 30, since the same signal pattern of the "ON" signals from all of the switches S1 to S3 also exists in the case that the manual valve 11 is positioned at the "D" range.

However, the TCU 20 (the malfunction determining portion 25) can determine that the malfunction has occurred in the position sensor 30, based on the change of the signal patterns, as in the same manner to the case of the short-circuit of the switch S1. Namely, this is because that the change from a signal pattern of the "ON" signals from the switches S2 and S3 to another signal pattern of the "ON" signals from all of the switches S1 to S3 does not exist in the signal pattern map of FIG. 6, which is memorized in the ROM 22.

(Short-Circuit of the Switch S3)

Figure 8C:
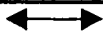

When a short-circuit occurs at the switch S3, the "ON" signal is always outputted from the switch S3 independently from the selected position of the manual valve 11, as shown in FIG. 8C. And the malfunction of the position sensor 30 can be detected in the following cases.

The "ON" signals are outputted from the switches S1 and S3, when the manual valve 11 is positioned at the "P" range. Since this signal pattern of the "ON" signals from the switches S1 and S3 also exists in the case that the manual valve 11 is in the "N-D" transition position, the TCU 20 can not determine only from this signal pattern that the malfunction has occurred in the position sensor 30.

When the manual valve 11 is moved from the "P" range to the "P-R" transition position, the "ON" signals are outputted from all of the switches S1 to S3. The TCU 20 can not, either, determine that the malfunction has occurred in the position sensor 30, from this signal pattern (the "ON" signals from all of the switches S1 to S3) or from the change of the signal patterns (the "ON" signals from the switches S1 and S2 to the "ON" signals from all of the switches S1 to S3).

When the manual valve 11 is moved from the "P-R" transition position to the "R" range, the "ON" signals are outputted from the switches S2 and S3. Accordingly, the TCU 20 can determine that the malfunction has occurred at the position sensor 30, from the change of the signal patterns, because the change of the signal patterns (from the signal pattern of the "ON" signals from all of the switches S1 to S3 to the signal pattern of the "ON" signals from the switches S2 and S3) does not exist in the signal pattern map of FIG. 6.

An operation for the second detecting mode is explained for the case, in which the switch S3 becomes out of order (short-circuited) during the manual valve 11 is operated after the start of the engine operation.

In the case that the switch S3 becomes short-circuited when the manual valve 11 is positioned at the "P" range or at the "P-R", the signal pattern is respectively changed from the "P" to the "N-D" or from the "P-R" to the "D" range". As a result, the malfunction determining portion 25 determine that a malfunction has occurred in the position sensor 30, since the changes of the signal patterns do not exist in the pattern changes of FIG. 6 of the normal operation.

As above, according to the above first embodiment, the malfunction of the position sensor 30 is determined from one of or in combination of the following information;

(1) the signal patterns ("ON" and "OFF" signals) from the respective switches S1 to S3, as indicated by "X" in FIGS. 7A to 7C and 8A to 8C; and (2) the change of the signal patterns, as indicated by horizontal and vertical arrows in the same drawings;

As already explained, the malfunction detection can be possible not only in the case that the switch has been made out of order (disconnected or short-circuited) before the start of the engine operation (as indicated by the horizontal arrows), but also in the case that the switch becomes out of order after the start of the engine operation (as indicated by the vertical arrows).

As a result, the malfunction of the position sensor 30 can be quickly and surely determined, independently from the position of the manual valve 11.

According to the above first embodiment, the three switches S1 to S3 can determine the malfunction of the position sensor 30 for the manual valve 11, whereas the shift lever 12 has four shift ranges. Namely, the number of switches can be reduced, and thereby the structure of the position sensor 30 can be made simpler.

A control device for the automatic transmission according to a second embodiment is explained. The same reference numerals are used for the same or substantially identical portions to the first embodiment, and the explanation for those portions will be omitted.

The control device 10 of the second embodiment has seven ranges to be selected by the vehicle driver, namely, "P" range, "R" range, "N" range, "D" range, "3" range, "2" range and "1" range, as shown in FIG. 9. And the position sensor 30 has four switches S1 to S4.

The respective switches S1 to S4 of the position sensor 30 output the "ON" signal and "OFF" signal depending on the selected shift range, as shown in FIG. 9. FIG. 9 shows a signal pattern map showing the relations between the positions of the manual valve 11 (the shift lever positions) and the signals from the switches S1 to S4, when the switches are operating in order. In the map shown in FIG. 9, a symbol "O" means the "ON" signal, whereas the blank means the "OFF" signal outputted from the respective switches. Further, "2-1" in the map of FIG. 9, means a transition period from "2" range to "1" range.

When the manual valve 11 of the automatic transmission operates in order, the manual valve 11 is moved among "P" range, "P-R" transition position, "R" range, "R-N" transition position, "N" range, "N-D" transition position, "D" range, "3" range, "2" range, "2-1" transition position, and "1" range, as shown in FIG. 9 by the vehicle driver. And the selected position of the manual valve 11 and the outputted signals from the switches S1 to S4 have the following relations.

When the manual valve 11 is positioned at the "P" range, the "OFF" signals are outputted from all of the switches S1 to S4.

When the manual valve 11 is in the "P-R" transition position, the "ON" signal is outputted from the switch S4, whereas the "OFF" signals are outputted from the switches S1 to S3.

When the manual valve 11 is positioned at the "R" range, the "ON" signals are outputted from the switches S1 and S4, whereas the "OFF" signals are outputted from the switches S2 and S3.

When the manual valve 11 is in the "R-N" transition position, the "ON" signals are outputted from the switches S1, S2 and S4, whereas the "OFF" signal is outputted from the switch S3.

When the manual valve 11 is positioned at the "N" range, the "ON" signals are outputted from the switches S1 and S2, whereas the "OFF" signals are outputted from the switches S3 and S4.

When the manual valve 11 is in the "N-D" transition position, the "ON" signals are outputted from the switches S1, S2 and S3, whereas the "OFF" signal is outputted from the switch S4.

When the manual valve 11 is positioned at the "D" range, the "ON" signals are outputted from all of the switches S1 to S4.

When the manual valve 11 positioned at the "3" range, the "ON" signals are outputted from the switches S2, S3 and S4, whereas the "OFF" signal is outputted from the switch S1.

When the manual valve 11 positioned at the "2" range, the "ON" signals are outputted from the switches S2 and S3, whereas the "OFF" signals are outputted from the switches S1 and S4.

When the manual valve 11 is in the "2-1" transition position, the "ON" signal is outputted from the switch S3, whereas the "OFF" signals are outputted from the switches S1, S2 and S4.

When the manual valve 11 positioned at the "1" range, the "ON" signals are outputted from the switches S1 and S3, whereas the "OFF" signals are outputted from the switches S2 and S4.

As above, when the selected range (position) of the manual valve 11 is changed, the different signal patterns of the output signals from the switches S1 to S4 are obtained. At least one of the "ON" signals or "OFF" signals from the switches S1 to S4 is kept unchanged, even when the selected range (position) of the manual valve 11 is changed. The above signal patterns shown in FIG. 9 formed as Gray code are memorized as the signal pattern map in the ROM 22.

An operation of the control device, namely a malfunction determining process by the TCU 20, in the case that one of the switches S1 to S4 of the position sensor 30 becomes out of order, is explained with reference to FIGS. 10A to 10D and 11A to 11D.

(Disconnection of the switch S1)

When a disconnection occurs at the switch S1, no "ON" signal is outputted from the switch S1 independently from the selected position of the manual valve 11, as shown in FIG. 10A.

As a result, when the manual valve 11 is positioned at the "R-N" transition position or "N" range, the signal pattern becomes to such a signal pattern (the "ON" signals from the switches S2 and S4 (indicated by "X1" in FIG. 10A) or the "ON" signal only from the switch S2 (indicated by "X2" in FIG. 10A)), which does not exist in the signal pattern map of FIG. 9. The TCU 20, therefore, determines that a malfunction has occurred at the position sensor 30, from this signal pattern.

When the manual valve 11 is moved, respectively, from the "R" range to the "R-N" transition position, from the "R-N" transition position to the "N" range, or from the "N" range to the "N-D" transition position, the change of the signal pattern also becomes to such a change of the signal patterns (from the "P-R" to "X1", from "X1" to "X2", or from "X2" to "2"), which does not exist in the signal pattern map of FIG. 9. The TCU 20 also determines that a malfunction has occurred at the position sensor 30, from this change of the signal patterns.

An operation for the second detecting mode is explained for the case, in which the switch S1 becomes out of order (disconnected) during the manual valve 11 is operated after the start of the engine operation.

In the case that the switch S1 becomes disconnected when the manual valve 11 is positioned at the "R-N", the "N" range or the "N-D", the signal pattern is respectively changed from the "R-N" to the "X1", from the "N" to the "X2", or from the "N-D" to the "2" range". As a result, the malfunction determining portion 25 determine that a malfunction has occurred in the position sensor 30, since the changes of the signal patterns do not exist in the pattern changes of FIG. 9 of the normal operation.

(Disconnection of the Switch S2)

When a disconnection occurs at the switch S2, no "ON" signal is outputted from the switch S2 independently from the selected position of the manual valve 11, as shown in FIG. 10B.

As a result, when the manual valve 11 is positioned at the "N" range, "D" range or "3" range, the signal pattern becomes to such a signal pattern (the "ON" signal only from the switch S1 indicated by "X4" in FIG. 10B, the "ON" signals from the switches S1, S3 and S4 indicated by "X5" in FIG. 10B, or the "ON" signals from the switches S3 and S4 indicated by "X6" in FIG. 10B), which does not exist in the signal pattern map of FIG. 9. The TCU 20, therefore, determines that a malfunction has occurred at the position sensor 30, from this signal pattern.

When the manual valve 11 is moved, respectively, from the "R-N" transition position to the "N" range, from the "N" range to the "N-D" transition position, the "N-D" transition position to the "D" range, from the "D" range to the "3" range, or from the "3" range to the "2" range, the change of the signal patterns also becomes to such a change of the signal patterns, which does not exist in the signal pattern map of FIG. 9. The TCU 20, therefore, determines that a malfunction has occurred at the position sensor 30, from this change of the signal patterns.

An operation for the second detecting mode is explained for the case, in which the switch S2 becomes out of order (disconnected) during the manual valve 11 is operated after the start of the engine operation.

In the case that the switch S2 becomes disconnected when the manual valve 11 is positioned at the "N" range, the "N-D", the "D" range, or "3" range, the signal pattern is respectively changed from the "N" to the "X4", from the "N-D" to the "1", from the "D" to the "X5", or from the "3" to the "X6". As a result, the malfunction determining portion 25 determine that a malfunction has occurred in the position sensor 30, since the changes of the signal patterns do not exist in the pattern changes of FIG. 9 of the normal operation.

(Disconnection of the Switch S3)

When a disconnection occurs at the switch S3, no "ON" signal is outputted from the switch S3 independently from the selected position of the manual valve 11, as shown in FIG. 10C.

As a result, when the manual valve 11 is positioned at the "3" range, "2" range or "1" range, the signal pattern becomes to such a signal pattern (the "ON" signals from the switches S2 and S4 indicated by the "X1" in FIG. 10C, the "ON" signal only from the switch S2 indicated by the "X2" in FIG. 10C, or the "ON" signal only from the switch S1 indicated by the "X4" in FIG. 10C), which does not exist in the signal pattern map of FIG. 9. The TCU 20, therefore, determines that a malfunction has occurred at the position sensor 30, from this signal pattern.

When the manual valve 11 is moved, respectively, from the "D" range to the "3" range, from the "3" range to the "2" range, from the "2" range to the "2-1" transition position, or from the "2-1" transition position to the "1" range, the change of the signal patterns also becomes to such a change of the signal patterns, which does not exist in the signal pattern map of FIG. 9. The TCU 20, therefore, determines that a malfunction has occurred at the position sensor 30, from this change of the signal patterns.

An operation for the second detecting mode is explained for the case, in which the switch S3 becomes out of order (disconnected) during the manual valve 11 is operated after the start of the engine operation.

In the case that the switch S3 becomes disconnected when the manual valve 11 is positioned at the "D" range, the "3", the "2", the "2-1", or "1" range, the signal pattern is respectively changed from the "D" to the "R-N", from the "3" to the "X1", from the "2" to the "X2", from the "2-1" to the "P", or from the "1" to the "X4". As a result, the malfunction determining portion 25 determine that a malfunction has occurred in the position sensor 30, since the changes of the signal patterns do not exist in the pattern changes of FIG. 9 of the normal operation.

(Disconnection of the Switch S4)

When a disconnection occurs at the switch S4, no "ON" signal is outputted from the switch S4 independently from the selected position of the manual valve 11, as shown in FIG. 10D.

As a result, when the manual valve 11 is positioned at the "R" range, the signal pattern becomes to such a signal pattern (the "ON" signal only from the switch S1), which does not exist in the signal pattern map of FIG. 9. The TCU 20, therefore, determines that a malfunction has occurred at the position sensor 30, from this signal pattern.

When the manual valve 11 is moved, respectively, from the "P-R" transition position to the "R" range, from the "R" range to the "R-N" transition position, or from the "D" range to the "3" range, the change of the signal patterns (indicated by the horizontal arrow in FIG. 10D) also becomes to such a change of the signal patterns, which does not exist in the signal pattern map of FIG. 9. The TCU 20, therefore, determines that a malfunction has occurred at the position sensor 30, from this change of the signal patterns.

An operation for the second detecting mode is explained for the case, in which the switch S4 becomes out of order (disconnected) during the manual valve 11 is operated after the start of the engine operation.

In the case that the switch S4 becomes disconnected when the manual valve 11 is positioned at the "R" range, the signal pattern is changed from the "R" to the "X4". As a result, the malfunction determining portion 25 determine that a malfunction has occurred in the position sensor 30, since the change of the signal patterns (indicated by the vertical arrow in FIG. 10D) does not exist in the pattern changes of FIG. 9 of the normal operation.

A malfunction determining process by the TCU 20, in the case that one of the switches S1 to S4 of the position sensor 30 short-circuited, is explained.

(Short-Circuit of the Switch S1)

When a short-circuit occurs at the switch S1, the "ON" signal is always outputted from the switch S1 independently from the selected position of the manual valve 11, as shown in FIG. 11A.

As a result, when the manual valve 11 is positioned at the "P" range, the signal pattern becomes to such a signal pattern (the "ON" signal only from the switch S1 indicated by "X4" in FIG. 11A), which does not exist in the signal pattern map of FIG. 9. The TCU 20, therefore, determines that a malfunction has occurred at the position sensor 30, from this signal pattern.

When the manual valve 11 is moved, respectively, from the "P" range to the "P-R" transition position, or from the "2" range to the "2-1" transition position, the change of the signal patterns also becomes to such a change of the signal patterns (indicated by the horizontal arrows in FIG. 11B), which does not exist in the signal pattern map of FIG. 9. The TCU 20, therefore, determines that a malfunction has occurred at the position sensor 30, from this change of the signal patterns.

An operation for the second detecting mode is explained for the case, in which the switch S1 becomes out of order (short-circuited) during the manual valve 11 is operated after the start of the engine operation.

In the case that the switch S1 becomes short-circuited when the manual valve 11 is positioned at the "P" range or the "2" range, the signal pattern is changed from the "P" to the "X4", or from the "2" range to the "N-D". As a result, the malfunction determining portion 25 determine that a malfunction has occurred in the position sensor 30, since the change of the signal patterns (indicated by the vertical arrows in FIG. 11A) do not exist in the pattern changes of FIG. 9 of the normal operation.

(Short-Circuit of the Switch S2)

When a short-circuit occurs at the switch S2, the "ON" signal is always outputted from the switch S2 independently from the selected position of the manual valve 11, as shown in FIG. 11B.

As a result, when the manual valve 11 is positioned at the "P" range or the "P-R" transition position, the signal pattern becomes to such a signal pattern (the "ON" signal only from the switch S2 indicated by the "X2" in FIG. 11B, or the "ON" signals from the switches S2 and S4 indicated by the "X1" in FIG. 11B), which does not exist in the signal pattern map of FIG. 9. The TCU 20, therefore, determines that a malfunction has occurred at the position sensor 30, from this signal pattern.

When the manual valve 11 is moved, respectively, from the "P" range to the "P-R" transition position, from the "P-R" transition position to the "R" range, or from the "2-1" transition position to the "1" range, the change of the signal patterns also becomes to such a change of the signal patterns (indicated by the horizontal arrows in FIG. 11B), which does not exist in the signal pattern map of FIG. 9. The TCU 20, therefore, determines that a malfunction has occurred at the position sensor 30, from this change of the signal patterns.

An operation for the second detecting mode is explained for the case, in which the switch S2 becomes out of order (short-circuited) during the manual valve 11 is operated after the start of the engine operation.

In the case that the switch S2 becomes short-circuited when the manual valve 11 is positioned at the "P" range, the "P-R", or the "1" range, the signal pattern is changed from the "P" to the "X2", from the "P-R" to the "X1", or from the "1" range to the "N-D". As a result, the malfunction determining portion 25 determine that a malfunction has occurred in the position sensor 30, since the changes of the signal patterns (indicated by the vertical arrows in FIG. 11B) do not exist in the pattern changes of FIG. 9 of the normal operation.

(Short-Circuit of the Switch S3)

When a short-circuit occurs at the switch S3, the "ON" signal is always outputted from the switch S3 independently from the selected position of the manual valve 11, as shown in FIG. 1C.

As a result, when the manual valve 11 is positioned at the "P-R" transition position or "R" range, the signal pattern becomes to such a signal pattern (the "ON" signals from the switches S3 and S4 indicated by "X6" in FIG. 1C, or the "ON" signals from the switches S1, S3 and S4 indicated by "X5" in FIG. 11C), which does not exist in the signal pattern map of FIG. 9. The TCU 20, therefore, determines that a malfunction has occurred at the position sensor 30, from this signal pattern.

When the manual valve 11 is moved, respectively, from the "P" range to the "P-R" transition position, from the "P-R" transition position to the "R" range, or from the "R" range to the "R-N" transition position, the change of the signal patterns also becomes to such a change of the signal patterns (as indicated by the horizontal arrows in FIG. 1C), which does not exist in the signal pattern map of FIG. 9. The TCU 20, therefore, determines that a malfunction has occurred at the position sensor 30, from this change of the signal patterns.

An operation for the second detecting mode is explained for the case, in which the switch S3 becomes out of order (short-circuited) during the manual valve 11 is operated after the start of the engine operation.

In the case that the switch S3 becomes short-circuited when the manual valve 11 is positioned at the "P" range, the "P-R", the "R" range, or the "R-N", the signal pattern is respectively changed from the "P" to the "2-1", from the "P-R" to the "X6", from the "R" to the "X5", or from the "R-N" to the "D" range. As a result, the malfunction determining portion 25 determine that a malfunction has occurred in the position sensor 30, since the changes of the signal patterns (indicated by the vertical arrows in FIG. 1C) do not exist in the pattern changes of FIG. 9 of the normal operation.

(Short-Circuit of the Switch S4)

When a short-circuit occurs at the switch S4, the "ON" signal is always outputted from the switch S4 independently from the selected position of the manual valve 11, as shown in FIG. 1D.

As a result, when the manual valve 11 is positioned at the "2-1" transition position or "1" range, the signal pattern becomes to such a signal pattern (the "ON" signals from the switches S3 and S4 indicated by "X6" in FIG. 1D, or the "ON" signals from the switches S1, S3 and S4 indicated by "X5" in FIG. 11D), which does not exist in the signal pattern map of FIG. 9. The TCU 20, therefore, determines that a malfunction has occurred at the position sensor 30, from this signal pattern.

When the manual valve 11 is moved, respectively, from the "N" range to the "N-D" transition position, from the "2" range to the "2-1" transition position, or from the "2-1" transition position to the "1" range, the change of the signal patterns also becomes to such a change of the signal patterns (as indicated by the horizontal arrows in FIG. 11D), which does not exist in the signal pattern map of FIG. 9. The TCU 20, therefore, determines that a malfunction has occurred at the position sensor 30, from this change of the signal patterns.

An operation for the second detecting mode is explained for the case, in which the switch S4 becomes out of order (short-circuited) during the manual valve 11 is operated after the start of the engine operation.

In the case that the switch S4 becomes short-circuited when the manual valve 11 is positioned at the "2-1" or the "1" range, the signal pattern is respectively changed from the "2-1" to the "X6", or from the "1" to the "X5". As a result, the malfunction determining portion 25 determine that a malfunction has occurred in the position sensor 30, since the changes of the signal patterns (indicated by the vertical arrows in FIG. 11D) do not exist in the pattern changes of FIG. 9 of the normal operation.

As above, according to the above second embodiment, the malfunction of the position sensor 30 is determined from one of or in combination of the following information, as in the same manner to the first embodiment;

(1) the signal patterns ("ON" and "OFF" signals) from the respective switches S1 to S4, as indicated by "X1" to "X6" in FIGS. 10A to 10D and 11A to 11D; and (2) the change of the signal patterns, as indicated by horizontal and vertical arrows in the same drawings;

As already explained, the malfunction detection can be possible not only in the case that the switch has been made out of order (disconnected or short-circuited) before the start of the engine operation (as indicated by the horizontal arrows), but also in the case that the switch becomes out of order after the start of the engine operation (as indicated by the vertical arrows).

As a result, the malfunction of the position sensor 30 can be quickly and surely determined, independently from the position of the manual valve 11.

According to the above second embodiment, the four switches S1 to S4 can determine the malfunction of the position sensor 30 for the manual valve 11, wherein the shift lever 12 has seven shift ranges. Namely, the number of switches can be reduced.

In the above first and second embodiments, any corresponding indicator 41 to 44 of the display portion 40 will be flashed on and off, when the malfunction is detected by the malfunction determining portion 25, so that the malfunction can be warned to the vehicle driver.

The combinations of the signal patters (the combinations of the "ON" signals and the "OFF" signals) shown in the above embodiments are explained as an example, and therefore, any other combinations of the signal patterns can be possible to achieve the same effect of the present invention. Furthermore, the manual valve 11 having the four or seven shift ranges are also explained as an example, and therefore, any other manual valves having the different number of the shift ranges can be likewise used to achieve the same effect of the present invention.

What is claimed is:

1. A control device for an automatic transmission of a vehicle comprising:

a position sensor having multiple switches, each of which generates "ON" signal or "OFF" signal depending on a selected position of a shift lever to be operated by a vehicle driver;

a transmission control unit having a signal input portion for receiving the "ON" signals and "OFF" signals from the respective switches;

a first memory portion provided in the transmission control unit and memorizing a map of signal patterns, which correspond to combinations of the "ON" and "OFF" signals from the respective switches at the respective selected positions of the shift lever, when those switches operate in order, wherein the map of signal pattern includes data for changes of the signal patterns which are caused by a movement of the shift lever from one selected position to another position;

a second memory portion provided in the transmission control unit for memorizing the "ON" and "OFF" signals inputted into the signal input portion from the switches;

a malfunction determining portion provided in the transmission control unit for comparing a signal pattern as well as a change of the signal patterns memorized in the second memory portion with the signal pattern as well as the change of the signal patterns memorized as the map of signal patterns in the first memory portion, wherein the malfunction determining portion determines that a malfunction has occurred in the position sensor when at least one of the signal patterns and the change of the signal patterns of the second memory portion does not coincide with any of the signal patterns or the changes of the signal patterns memorized in the first memory portion.

2. A control device for an automatic transmission according to claim 1, wherein the selected positions of the shift lever include; multiple shift ranges of "P", "R", "N" and "D" ranges; and multiple transition positions ("P-R", "R-N" and "N-D") between the respective shift ranges, and wherein the signal patterns at the respective selected positions of the shift lever are different from one another.

3. A control device for an automatic transmission according to claim 2, wherein the selected positions of the shift lever include four shift ranges, and wherein the position sensor comprises three switches for generating the "ON" and "OFF" signals.

4. A control device for an automatic transmission according to claim 1, wherein the map of signal patterns is formed as Gray code.

5. A control device for an automatic transmission according to claim 1, wherein the position sensor comprises;

a sliding portion movably supported by a fixed portion in a sliding manner, and operatively moved by the shift lever;

multiple magnetic elements provided on the sliding portion; and multiple hall elements provided on the fixed portion, so that the hall elements face to the magnetic elements and relative positions of the hall elements to the magnetic elements are changed when the sliding portion is moved by the shift lever.

* * * * *